(12) United States Patent
Pal et al.

(10) Patent No.: US 9,715,514 B2
(45) Date of Patent: Jul. 25, 2017

(54) K-ARY TREE TO BINARY TREE CONVERSION THROUGH COMPLETE HEIGHT BALANCED TECHNIQUE

(71) Applicant: University of Calcutta, Kolkata (IN)

(72) Inventors: Rajat Kumar Pal, West Bengal (IN); Angana Chakraborty, West Bengal (IN); Novarun Deb, West Bengal (IN)

(73) Assignee: UNIVERSITY OF CALCUTTA, Kolkata, West Bengal (IN)

( * ) Notice: Subject to any disclaimer, the term of this patent is extended or adjusted under 35 U.S.C. 154(b) by 796 days.

(21) Appl. No.: 13/879,804

(22) PCT Filed: Oct. 19, 2012

(86) PCT No.: PCT/IB2012/002095
§ 371 (c)(1),
(2) Date: Dec. 5, 2013

(87) PCT Pub. No.: WO2013/186588
PCT Pub. Date: Dec. 19, 2013

(65) Prior Publication Data
US 2015/0169657 A1 Jun. 18, 2015

(30) Foreign Application Priority Data
Jun. 15, 2012 (IN) .............................. 671/KOL/2012

(51) Int. Cl.
*G06F 17/30* (2006.01)
(52) U.S. Cl.
CPC .. *G06F 17/30327* (2013.01); *G06F 17/30076* (2013.01); *G06F 17/30961* (2013.01)

(58) Field of Classification Search
CPC ......... G06F 17/30327; G06F 17/30076; G06F 17/30961
See application file for complete search history.

(56) References Cited

U.S. PATENT DOCUMENTS 8,792,506 B2 * 7/2014 Gumaste ................. H04L 45/04
370/401

OTHER PUBLICATIONS

International Search Report and Written Opinion for PCT/IB2012/002095, filed Oct. 19, 2012, mailed on Nov. 2, 2012.
Ghosh, et al., "A New Algorithm to Represent a Given k-ary Tree into Its Equivalent Binary Tree Structure", Journal of Physical Sciences (ISSN: 0972-8791),vol. 12, pp. 253-284, Dec. 2008.

(Continued)

*Primary Examiner* — Alexey Shmatov
(74) *Attorney, Agent, or Firm* — Turk IP Law, LLC

(57) ABSTRACT

Technologies are generally provided for converting a k-ary tree to an equivalent height balanced binary tree. A k-ary tree root may be first set as the binary tree root. Nodes may then be inserted in the binary tree based on nodes of the k-ary tree. First two children of each k-ary tree node may be inserted as left and right children in the binary tree. If there are additional children, those may be inserted into a child queue. If there are less than two children in the k-ary tree, children from the child queue may be used to fill the left and right child nodes in the equivalent binary tree repeating the process level-wise until all nodes in the k-ary tree are processed.

16 Claims, 11 Drawing Sheets

(56) References Cited

OTHER PUBLICATIONS

Ghosh, et al., "An Algorithm for Converting a Given k-ary Tree into Its Equivalent Binary Tree", Proceedings of the First International Conference on Computer, Communication, Control and Information Technology (C3IT 2009), Academy of Technology, Adisaptagram (Hooghly, West Bengal), India, pp. 56-62, Feb. 6-7, 2009.

Islam et al., "Tree based Consistency Approach for Cloud Databases", Proceedings of the Second International Conference on Cloud Computing Technology and Science (CloudCom) 2010, IEEE, pp. 401-404, Dec. 2010.

* cited by examiner

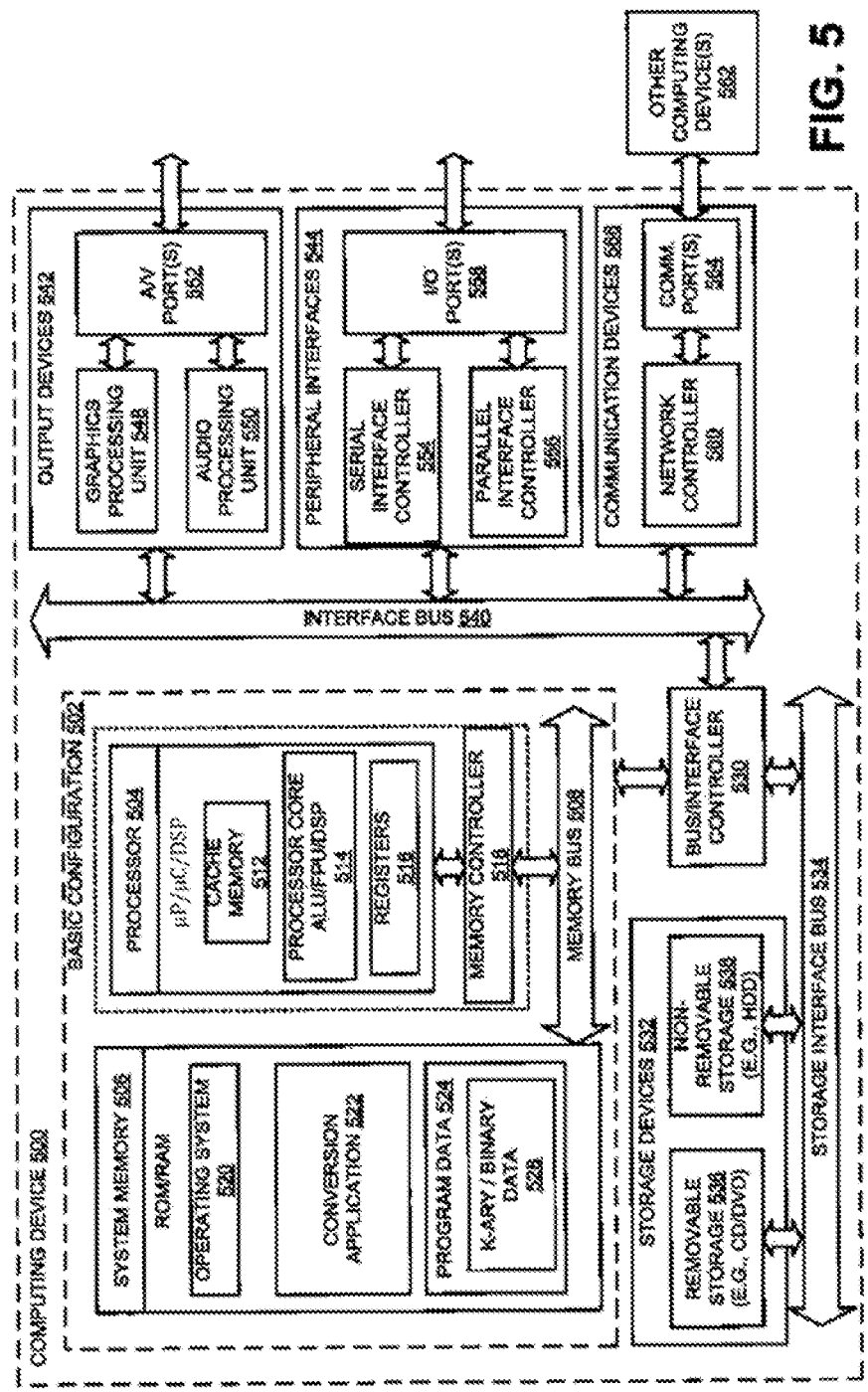

K-ARY TREE TO BINARY TREE CONVERSION THROUGH COMPLETE HEIGHT BALANCED TECHNIQUE

CROSS-REFERENCE TO RELATED APPLICATIONS

This application is a U.S. National Stage filing under 35 U.S.C. §371 of International Application Ser. No. PCT/IB2012/002095, filed on Oct. 19, 2012, which claims priority under PCT Article 8 and/or 35 U.S.C. §119(a) to Indian Application No. 671/KOL/2012, filed on Jun. 15, 2012. The disclosures of the International Application and the Indian Application are herein incorporated by reference in their entireties.

BACKGROUND

Unless otherwise indicated herein, the materials described in this section are not prior art to the claims in this application and are not admitted to be prior art by inclusion in this section.

Some databases may contain millions of records, resulting in many gigabytes of storage. For example, telecommunications companies maintain customer billing databases with billions of rows and terabytes of data. In order for a database to be useful and usable, it needs to be able to perform desired database operations, such as retrieval and storage, relatively quickly. As large databases may not be maintained entirely in memory, k-ary tree structures may be used to index the data and to provide fast access. For example, searching an unindexed and unsorted database containing n key values may necessitate a worst-case running time of O(n). In contrast, if the same data is indexed with a tree structure such as a k-ary tree structure, the same search operation takes time O(log n). Indexing large databases may significantly improve search performance.

SUMMARY

The present disclosure generally describes technologies for converting a k-ary tree to its equivalent binary tree using a complete height balanced technique.

According to some examples, a method for converting a k-ary tree to an equivalent height balanced binary tree may include setting a root of the k-ary tree as a root of the binary tree, inserting nodes in the binary tree based on nodes of the k-ary tree in level order by: if the k-ary tree node has no children, inserting first two elements of a child queue into the binary tree; if the k-ary tree node has one child, inserting the child as a left child of the k-ary tree node in the binary tree and inserting the a element of the child queue into the binary tree as a right child of the k-ary tree node; if the k-ary tree node has two children, inserting the two children as child nodes of the k-ary tree node in the binary tree; and if the k-ary tree node has more than two children, inserting two leftmost children of the k-ary tree node as child nodes of the k-ary tree node in the binary tree and inserting remaining children of the k-ary tree node into the child queue, and repeating the level order insertion of the nodes into the binary tree until all nodes in the k-ary tree are processed.

According to other examples, a computing device for converting a k-ary tree to an equivalent height-balanced binary tree may include a memory configured to store instructions and a processing unit configured to execute a conversion application in conjunction with the instructions. The conversion application may set a root of the k-ary tree as a root of the binary tree, insert nodes in the binary tree based on nodes of the k-ary tree in level order by: if a k-ary tree node has no children, insert first two elements of a child queue into the binary tree; if the k-ary tree node has one child, insert the child as a left child of the k-ary tree node in the binary tree and insert a first element of the child queue into the binary tree as a right child of the k-ary tree node; if the k-ary tree node has two children, insert the two children as child nodes of the k-ary tree node in the binary tree; and if the k-ary tree node has more than two children, insert the two leftmost children of the k-ary tree node as child nodes of the k-ary tree node in the binary tree and insert remaining children of the k-ary tree node into the child queue, and repeat the level order insertion of the nodes into the binary tree until all nodes in the k-ary tree are processed.

According to further examples, a computer readable storage medium may have instructions stored thereon for converting a k-ary tree to an equivalent height balanced binary tree. The instructions may include setting a root of the k-ary tree as a root of the binary tree, insetting nodes in the binary tree based on nodes of the k-ary tree in level order by: if the k-ary tree node has no children, inserting first two elements of a child queue into the binary tree; if the k-ary tree node has one child, inserting the child as a left child of the k-ary tree node in the binary tree and inserting a first element of the child queue into the binary tree as a right child of the k-ary tree node; if the k-ary tree node has two children, inserting the two children as child nodes of the k-ary tree node in the binary tree; and if the k-ary tree node has more than two children, inserting two leftmost children of the k-ary tree node as child nodes of the k-ary tree node in the binary tree and inserting remaining children of the k-ary tree node into the child queue, and repeating the level order insertion of the nodes into the binary tree until all nodes in the k-ary tree are processed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates a general purpose computing device, which may be used to convert a k-ary tree to its equivalent binary tree and/or perform a reverse/back conversion from a binary tree to its equivalent k-ary tree using a complete height balanced technique;

DETAILED DESCRIPTION

Figure 1:
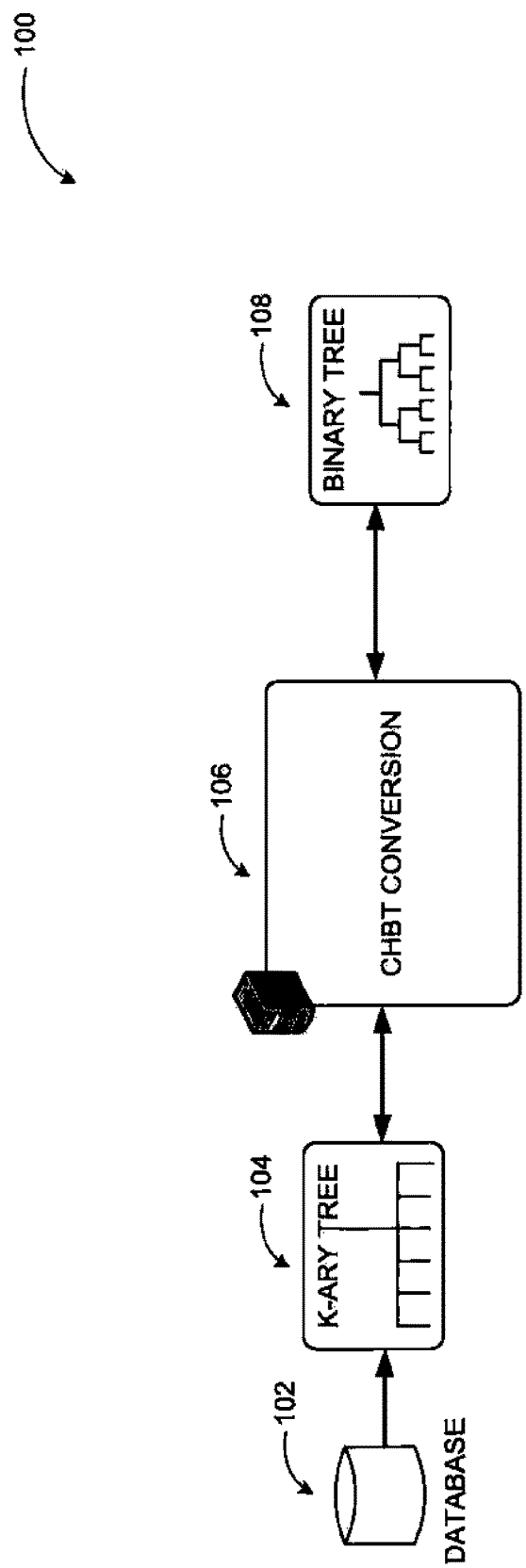
FIG. 1 illustrates an example system, where conversion of a k-ary tree to its equivalent binary tree through a complete height balanced technique may be used in indexing a database.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to converting a k-ary tree to its equivalent binary tree using a complete height balanced technique.

Briefly stated, technologies are generally provided for converting a k-ary tree to an equivalent height balanced binary tree. A k-ary tree root may be first set as a binary tree root. Nodes may then be inserted in the binary tree based on nodes of the k-ary tree. First two children of each k-ary tree node may be inserted as left and right children in the binary tree. If there are additional children, those may be inserted into a child queue. If there are less than two children in the k-ary tree, children from the child queue may be used to fill the left and right child nodes in the equivalent binary tree repeating the process level-wise until all nodes in the k-ary tree are processed.

As described above, k-ary tree structures may be used for data organization in databases. A k-ary tree structure is a nonlinear data structure where each node in the tree can have at most k children (k≥3). However, in some embodiments, a binary tree structure may have several advantages over a k-ary tree structure. For example, a binary tree is the simplest possible tree structure, because in a binary tree each node has (at most) only two children, whereas in a k-ary tree structure each node can have k children. Therefore, node structures in k-ary trees may be larger and more complex and therefore more difficult to maintain.

As another example, implementation of a k-ary tree structure may involve more space than an equivalent binary tree. A tree is a connected graph with n nodes and n−1 edges. In a binary tree with n nodes, there are 2n links and 2n−(n−1)=n+1 null links (i.e., a link that does not connect to another node). In contrast, a k-ary tree with n nodes has kn links (where k>2) and kn−(n−1)=n(k−1)+1 null links, increasing the space to store the tree by a factor of k.

As yet another example, while in binary tree structures there exists several possible tree traversals, such as in-order, preorder (parent then children), postorder (children then parent), etc., in k-ary tree structures in-order traversal may not be possible. Since in-order traversal produces a sorted sequence of keys in the tree, this means that tree sorting is not possible for k-ary trees.

Moreover, since the searching time for a balanced binary search tree with n nodes is $O(\log_2 n)$ and the searching time for a balanced k-ary search tree of n nodes is $O(\log_k n)$, and $O(\log_2 n) = O(\log_k n)$ (because according to logarithmic rules $\log_2 n$ only differs from $\log_k n$ by a constant for any given value of k), a binary tree structure may be just as efficient as a k-ary tree structure in terms of asymptotic complexity. Therefore, converting a k-ary tree structure into a binary tree structure may be advantageous.

In some embodiments, it may be possible to convert a k-ary tree structure to a binary tree structure with the Leftmost-Child-next-Right-Sibling (LCRS) approach. However, the LCRS approach may be problematic, because when it is applied, the binary tree structure obtained may have a degenerate structure. Since the time needed to search a key from a degenerate binary tree structure is $O(n)$, as opposed to a search time of $O(\log_k n)$ for a k-ary tree, converting a k-ary tree to a degenerate binary tree via the LCRS approach would increase the search time complexity, which may be undesirable.

FIG. 1 illustrates an example system 100, where conversion of a k-ary tree to its equivalent binary tree through a complete height balanced technique may be used in indexing a database, arranged in accordance with at least some embodiments described herein. The system 100 may include a database 102 storing data in a k-ary tree structure 104. The k-ary tree structure 104 may be converted into a binary tree 108 via a complete height balanced technique (CHBT) conversion application 106. The potential advantages of a binary tree structure over a k-ary tree structure are described above. In addition, the CHBT conversion application 106 may assure that the resultant binary tree 108 is complete (i.e., every level in the binary tree 108 except possibly the last is fully populated) and height balanced (i.e., the binary tree 108 has the minimum height possible given the number of nodes). As a result of these properties, the resulting binary tree structure 108 may be non-degenerate, thus having a search time of $O(\log_2 n)$ (instead of $O(n)$ for a degenerate binary tree resulting from the LCRS technique stated above). In some embodiments, the CHBT conversion application 106 may also be configured to convert the binary tree structure 108 back into the k-ary tree structure 104.

Table 1 depicts a relative comparison between the heights of binary trees produced by the LCRS technique and the CHBT approach. As evident in Table 1, the height of the binary tree converted using the CHBT is less than the height of the binary tree converted using the LCRS technique, which may provide significant size savings and search efficiency improvement.

TABLE 1

LCRS vs. CHBT comparison

| Degree of the k-ary tree (i.e., k) | Height of the k-ary tree (i.e., h) | Height h1 (≤hk) using LCRS | Height h2 (≤⌈hlog$_2$k⌉) using CHBT |
|---|---|---|---|
| 3 | 0 | 0 | 0 |
| 3 | 1 | ≤3 | ≤2 |
| 3 | 2 | ≤6 | ≤4 |
| 3 | 3 | ≤9 | ≤5 |
| 3 | 4 | ≤12 | ≤7 |
| 3 | 5 | ≤15 | ≤8 |
| 3 | 6 | ≤18 | ≤10 |
| 3 | 7 | ≤21 | ≤12 |
| 3 | 8 | ≤24 | ≤13 |
| 3 | 9 | ≤27 | ≤15 |
| 4 | 0 | 0 | 0 |
| 4 | 1 | ≤4 | ≤2 |
| 4 | 2 | ≤8 | ≤4 |
| 4 | 3 | ≤12 | ≤6 |
| 4 | 4 | ≤16 | ≤8 |
| 4 | 5 | ≤20 | ≤10 |
| 4 | 6 | ≤24 | ≤12 |
| 4 | 7 | ≤28 | ≤14 |
| 4 | 8 | ≤32 | ≤16 |
| 4 | 9 | ≤36 | ≤18 |
| 5 | 0 | 0 | 0 |
| 5 | 1 | ≤5 | ≤3 |
| 5 | 2 | ≤10 | ≤5 |
| 5 | 3 | ≤15 | ≤7 |
| 5 | 4 | ≤20 | ≤10 |
| 5 | 5 | ≤25 | ≤12 |
| 5 | 6 | ≤30 | ≤14 |
| 5 | 7 | ≤35 | ≤17 |
| 5 | 8 | ≤40 | ≤19 |
| 5 | 9 | ≤45 | ≤21 |

The CHBT for k-ary tree conversion may be particularly useful in the field of cloud computing. Cloud computing may involve providing Infrastructure-, Platform-, and Software- and Database-as-a-Service. However, maintaining consistency among replica servers may be problematic in cloud databases. Too much interdependency of replica servers may reduce performance and throughput, and may increase the transaction failure rate of a cloud database. Tree based consistency approaches that reduce interdependency among replica servers may be used to ensure the maximum reliable path from the primary server to all replica servers, thereby greatly reducing the probability of a transaction failure. k-ary trees may be used for this purpose. Converting these k-ary trees to height balanced binary trees, operating on these height balanced trees and then, finally, reverting back to the k-ary structures, may improve the performance of existing techniques.

The CHBT may also be useful for data sharing applications. Sharing data over a third-party distribution framework such as the cloud computing paradigm may involve assurance of both data authenticity and confidentiality. Tree structures are often used for data organization. The CHBT, which may convert a height unbalanced or balanced k-ary tree into a completely height balanced binary tree, may assist in providing leakage-free authentication of tree structured data, thereby improving the performance of data sharing techniques.

In some embodiments, a reverse/back conversion process may be employed by the CHBT conversion application 106 to create the k-ary tree structure 104 from the binary tree 108 following a reverse technique as described below in conjunction with FIG. 4A through 4C.

Figure 2A:
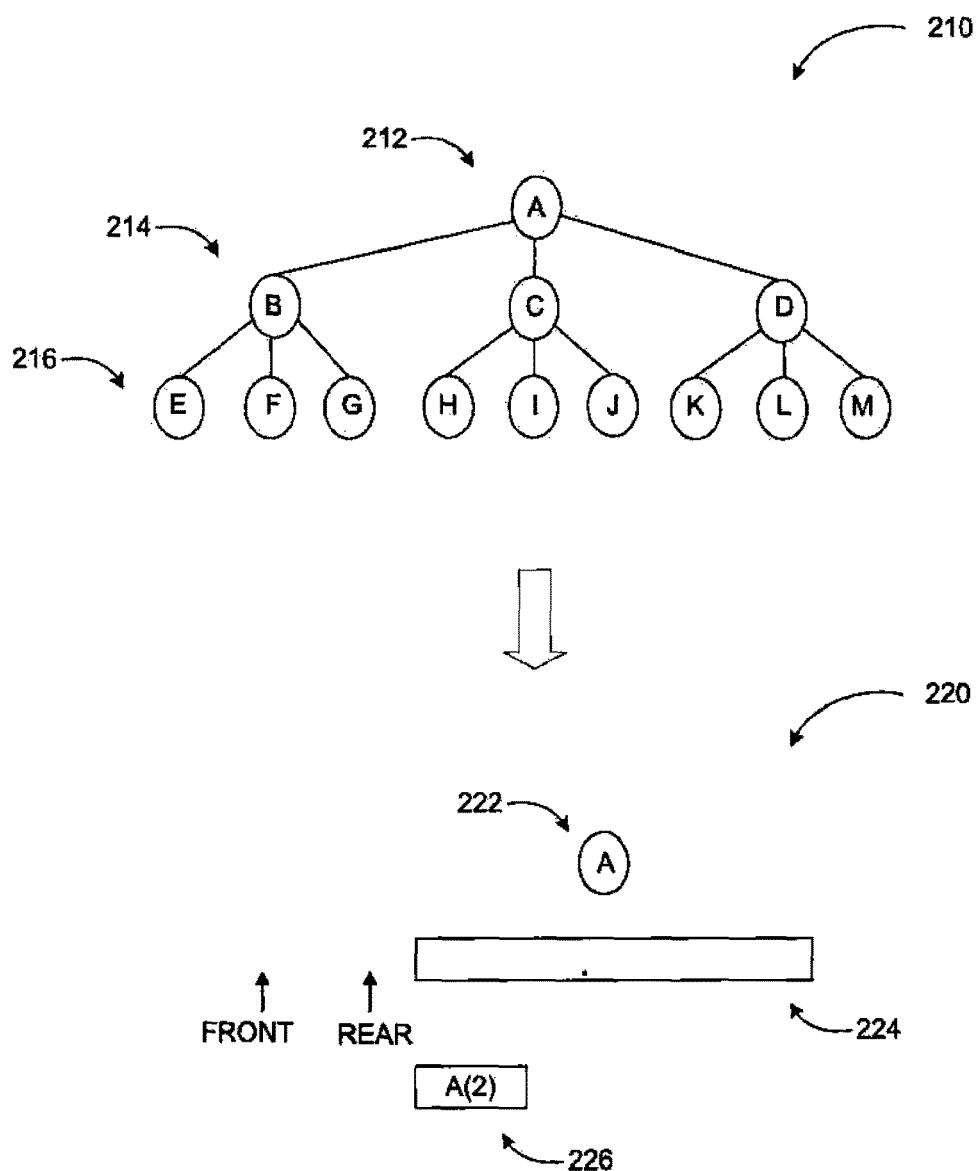
FIG. 2A illustrates a first operation of an example conversion technique, where the root node of an equivalent binary tree is set and an empty child queue initiated based on an example k-ary tree.

FIG. 2A illustrates a first operation 220 of an example conversion technique, similar to the conversion done by the CHBT conversion application 106 described above, arranged in accordance with at least some embodiments described herein. In FIG. 2A, a k-ary tree structure 210 with 13 nodes (A-M) is provided, where k (the number of children per node) is 3. The k-ary tree structure 210 has three levels 212, 214, and 216, where nodes on a particular level may be parents of nodes on the next lower level, and nodes on a particular level may be children of nodes on the next higher level (e.g., a node on the level 212 may be a parent of a node on the level 214, and a node on the level 214 may be a child of a node on the level 212). In other embodiments, the k-ary tree may have fewer or more nodes and/or levels, and k may be greater than 3.

In the first operation 220, the root node of the k-ary tree structure 210 may be selected to be the root node 222 of the binary tree structure. A child queue 224 may be initiated in the first operation 220, which may later be used to temporarily store child nodes of the k-ary tree structure 210 that are to be inserted into the binary tree structure. The child queue 224 may operate in First-In-First-Out (FIFO) order, in which elements are removed in the order in which they are added to the queue. For example, if a second element is added to a child queue that operates in FIFO order and already contains a first element added earlier, the first element is removed before the second element is removed. The child queue 224 therefore may have a "FRONT" pointer and a "REAR" pointer, as shown in FIG. 2A. The child nodes may be added to the child queue 224 starting from the "FRONT" and moving toward the "REAR" as an insertion is made through the "REAR" pointer and this pointer moves to the right, and may be removed/deleted from the child queue 224 starting from the "FRONT" and moving toward the "REAR" as a deletion is made through the "FRONT" pointer and this pointer also moves to the right.

A hands remaining queue 226 used to store nodes with free links may also be initiated. The hands remaining queue 226 may also operate in FIFO order, with the node(s) at the least depth having null links, and is the leftmost node with null links at that depth, being at the front of the queue. In the first operation 220, the root node 222 of the binary tree structure (i.e., node A) is the only node with free links, and so the hands remaining queue 226 only includes node A (and also includes the number of free links associated with A, which happens to be 2).

Figure 2B:
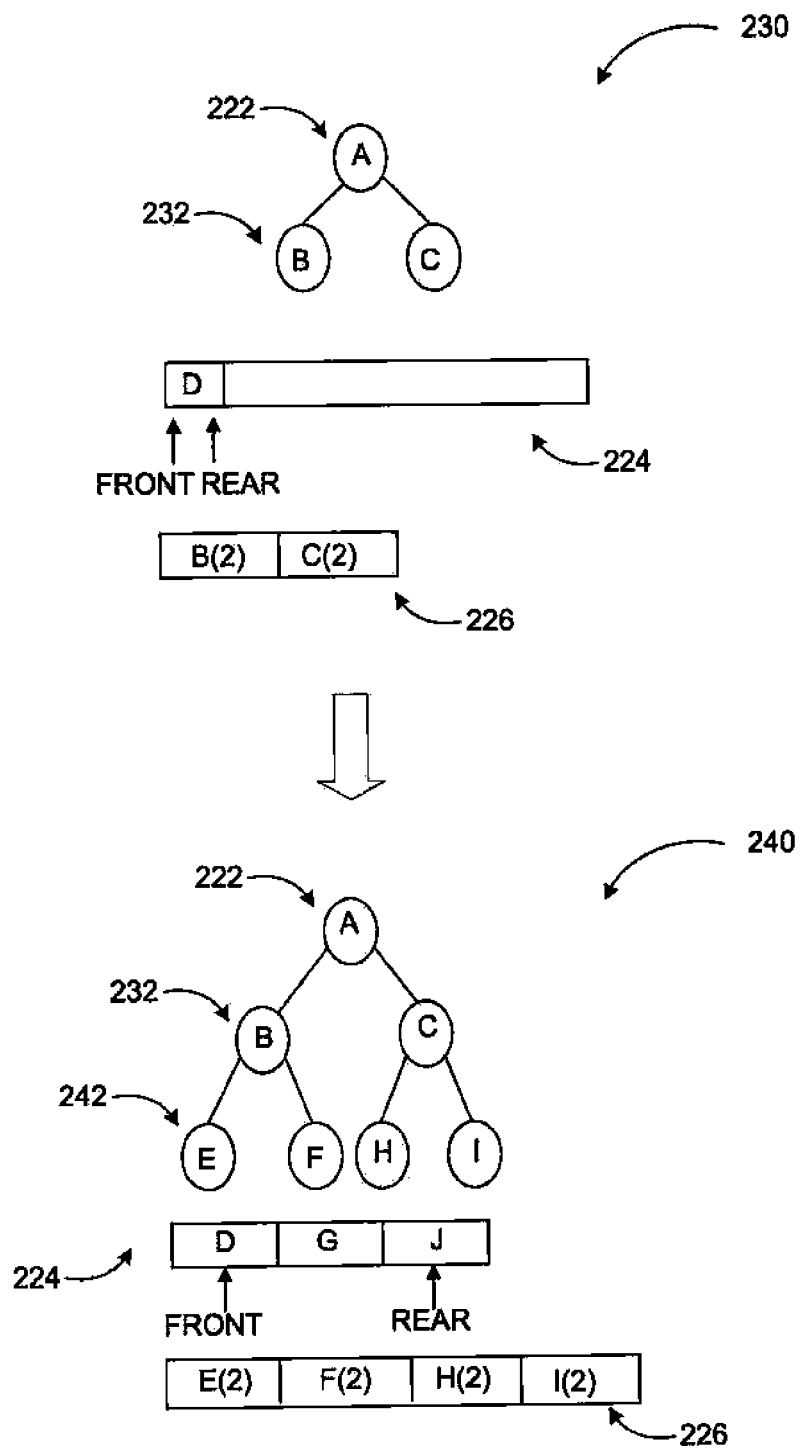
FIG. 2B illustrates subsequent operations of the example conversion technique, where first three levels of the equivalent binary tree are determined using the child queue and a hands remaining queue.

FIG. 2B illustrates subsequent operations of the example conversion technique, where first three levels of the equivalent binary tree are determined using the child queue and the hands remaining queue, arranged in accordance with at least some embodiments described herein. In general, the equivalent binary tree structure is constructed from the k-ary tree structure by inserting nodes into the binary tree structure in level order (i.e., from left to right on a given level) while maintaining completeness (and therefore height balance). If a given node has no children in the k-ary tree, then the first two elements of the child queue 224 is inserted into the binary tree as children of the given node. If the given node has one child in the k-ary tree, as any one of the 1 through k possible children, then that child becomes the left child of the given node in the binary tree and the first element of the child queue 224 becomes the right child of the given node in the binary tree. If the given node has two children in the k-ary tree, then those two children remain children of the given node in the binary tree. If the given node has more than two children in the k-ary tree, then the two leftmost children become the children of the node in the binary tree, and the remaining children are inserted into the child queue 224.

Following the first operation 220 described in FIG. 2A, it may be determined if the just inserted node (i.e., node A) has any children in the k-ary tree structure 210 (depicted in FIG. 2A). The node A has three children (nodes B, C, and D) in the k-ary tree structure 210. At the same time, the hands remaining queue 226 includes two free links associated with node A (depicted in FIG. 2A). Therefore, in a second operation 230, the two leftmost children of node A in the k-ary tree structure 210, which are the nodes B and C, may be inserted as the children of node A in the binary tree structure at a second level 232, thus using up the two free links associated with the node A. The node D cannot be inserted as a child of the node A in the binary tree structure because there are no free links remaining, and thus may be added to the child queue 224 (depicted in FIG. 2B). The hands remaining queue 226 may then be updated by removing node A (which no longer has free links) and adding the nodes B and C (newly inserted into the second level 232 of the binary tree), each having two free links (depicted in FIG. 2B).

In a subsequent operation 240, it may be determined if the just inserted nodes (the nodes B and C) have any children in the k-ary tree structure 210 (depicted in FIG. 2A). The node B has three children (nodes E, F, and G), as does the node C (nodes H, I, and J). At the same time, the hands remaining queue 226 shows that the nodeB has two free links and the node C has two free links (depicted in FIG. 2B). Therefore, the two leftmost children of the node B in the k-ary tree structure 210 (the nodes E and F) may be inserted as the children of the node B in the binary tree structure at a third level 242, while the two leftmost children of node C in the k-ary tree structure 210 (the nodes H and I) may be inserted as the children of the node C in the binary tree structure at the third level 242. No free links of the nodes B and C remain, and so the remaining child nodes (the nodes G and J) may then be added to the "REAR" of the child queue 224 (behind node D). The hands remaining queue 226 may then be updated by removing the nodes B and C and adding the nodes E, F, H, and I, each having two free links (depicted in FIG. 2B).

Figure 2C:
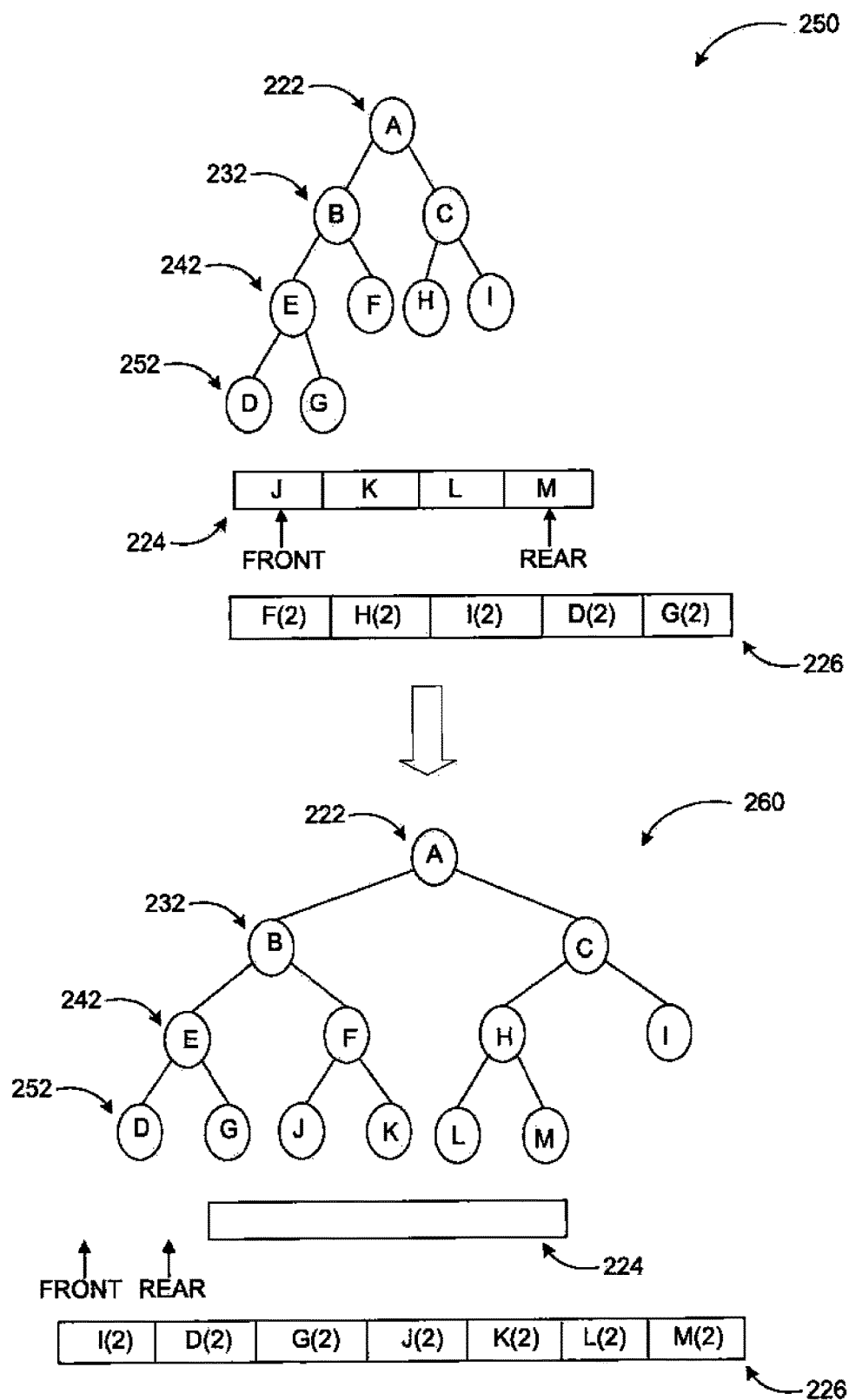
FIG. 2C illustrates a final operation of the example conversion technique arriving at the complete, height balanced, equivalent binary tree.

FIG. 2C illustrates final operations 250 and 260 of the example conversion technique arriving at the complete, height balanced, equivalent binary tree, arranged in accordance with at least some embodiments described herein. Following the operation 240 described in FIG. 2B, it may be determined in the operation 250 if the just inserted nodes (the nodes E, F, H, and I) have any children in the k-ary tree structure 210 (depicted in FIG. 2A). They do not have any children, and so the front two elements in the child queue 224, the nodes D and G, are inserted at the fourth level 252 as children of the node E, the leftmost, lowest level node with free links (as shown by the position of the node E in the hands remaining queue 226) (depicted in FIG. 2B). The node G does not have any children in the k-ary tree structure 210, but the node D does (the nodes K, L, and M), and so the children of the node D in the k-ary tree structure 210 are inserted into the child queue 224 (depicted in FIG. 2C). At the same time, the hands remaining queue 226 may be updated by removing the node E and adding the nodes D and G, each having two free links.

In the final operation 260, the remaining elements in the child queue 224 (none of which have children in the k-ary tree structure 210) may be inserted into the binary tree structure at the fourth level 252 from left to right. The nodes J and K, the front-most elements in the child queue 224, may be inserted at the fourth level 252 as children of the node F, and the nodes L and M, the last two elements in the child queue 224, may be inserted at the fourth level 252 as children of the node H. The child queue 224 may subsequently be updated by removing the nodes J, K, L, and M, and the hands remaining queue 226 may be updated by removing the nodes F and H and adding the nodes J, K, L, and M, each having two free links (depicted in FIG. 2C).

The example conversion technique to convert a k-ary tree structure to a binary tree structure described above may in some embodiments be generalized to a technique operating with particular data structures, in addition to a child queue and hands remaining queue as described above.

Figure 3:
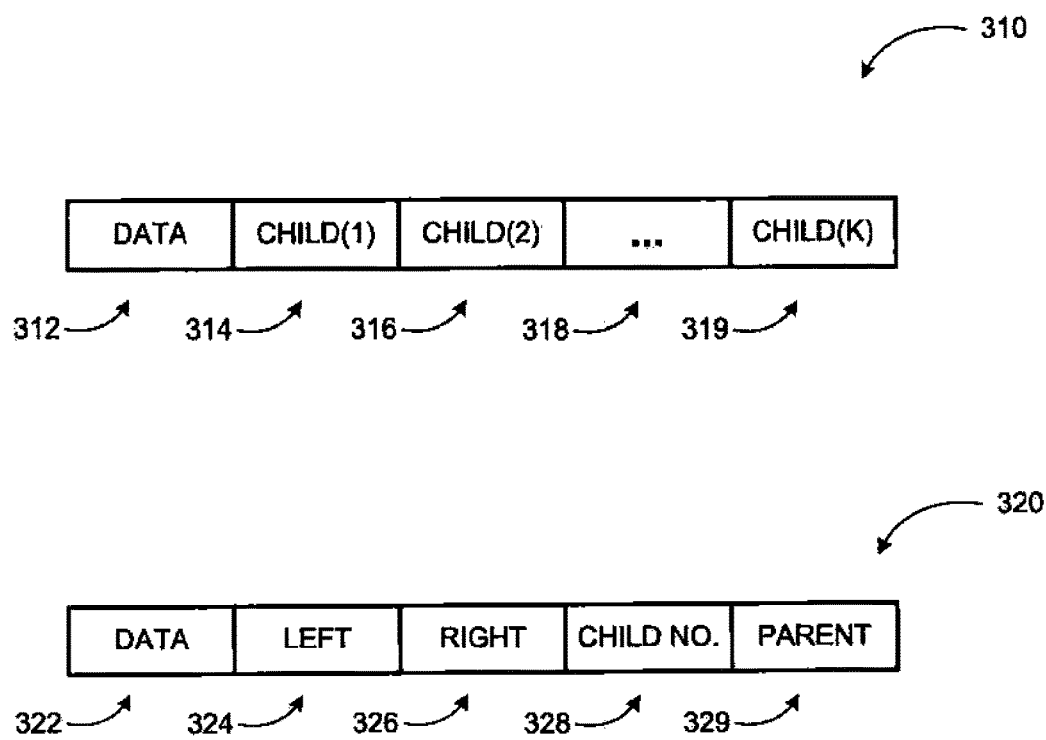
FIG. 3 illustrates example data structures for storing nodes of the k-ary and binary trees of the example conversion technique.

FIG. 3 illustrates example data structures 310 and 320 for storing nodes of k-ary and binary trees of the example conversion technique, arranged in accordance with at least some embodiments described herein. The data structure 310 may store information in one or more data fields about a particular node in a k-ary tree. In some embodiments, the data structure 310 may include k+1 data fields. A data field 312 may store the key of the particular k-ary tree node the data structure 310 describes. A data field 314 may store a pointer to the first (e.g., leftmost) child of the particular node. A data field 316 may store a pointer to the second child of the particular node. One or more data fields 318 may store pointer(s) to one or more other children of the particular node, up to the second-to-the-last (e.g., k−1) child. A data field 319 may store a pointer to the last (e.g., rightmost or kth) child of the particular node.

In some embodiments, the data structure 320 may store information in one or more data fields about a particular node in a binary tree. In some embodiments, the data structure 320 may include five data fields. A data field 322 may store the key of the particular binary tree node the data structure 320 describes. A left field 324 may store a pointer to the left child of the particular node. A right field 326 may store a pointer to the right child of the particular node. A child number field 328 may indicate which child the particular node is of its parent in the k-ary tree structure. For example, a value of k in the child number field 328 may mean that the particular node was the kth child of its parent in the k-ary tree structure. Finally, a parent data field 329 may store a pointer to the node in the binary tree that was the parent of the particular node in the k-ary tree. In some embodiments, if the particular node has the same parent node in the k-ary tree and the binary tree, the parent data field 329 may store a NULL value.

In some embodiments, a technique to convert a k-ary tree to an equivalent binary tree structure using the data structures described above may be expressed as follows:

Operation 1: Select the root of the k-ary tree as the root of the equivalent binary tree.

Operation 2: Whenever a node is inserted into the equivalent binary tree, make an entry for it in a hands remaining queue.

Operation 3: If a node is being inserted from the child queue then introduce all its children in the k-ary tree into the child queue. Go to Operation 9.

Operation 4: Otherwise, check its number of children.

Operation 5: If the number of children is equal to two, make them the left and right child of that node in the equivalent binary tree.

Operation 6: If the number of children is greater than two, insert the two leftmost children of the node as its children in the equivalent binary tree. Insert the remaining children of the node into the child queue.

Operation 7: If the number of children is equal to one (either of 1 through k), make it the left child of the same node in the equivalent binary tree. Take the first child (if any) from the front of the child queue and make it the right child of the same node in the equivalent binary tree.

Operation 8: If the number of children is equal to zero, take the first two children (if any) from the front of the child queue and make them the left and right child of the node in the equivalent binary tree.

Operation 9: Repeat Operations 2 through 8 till the child queue gets empty and all nodes of the k-ary tree have been processed level-wise.

Figure 4A:
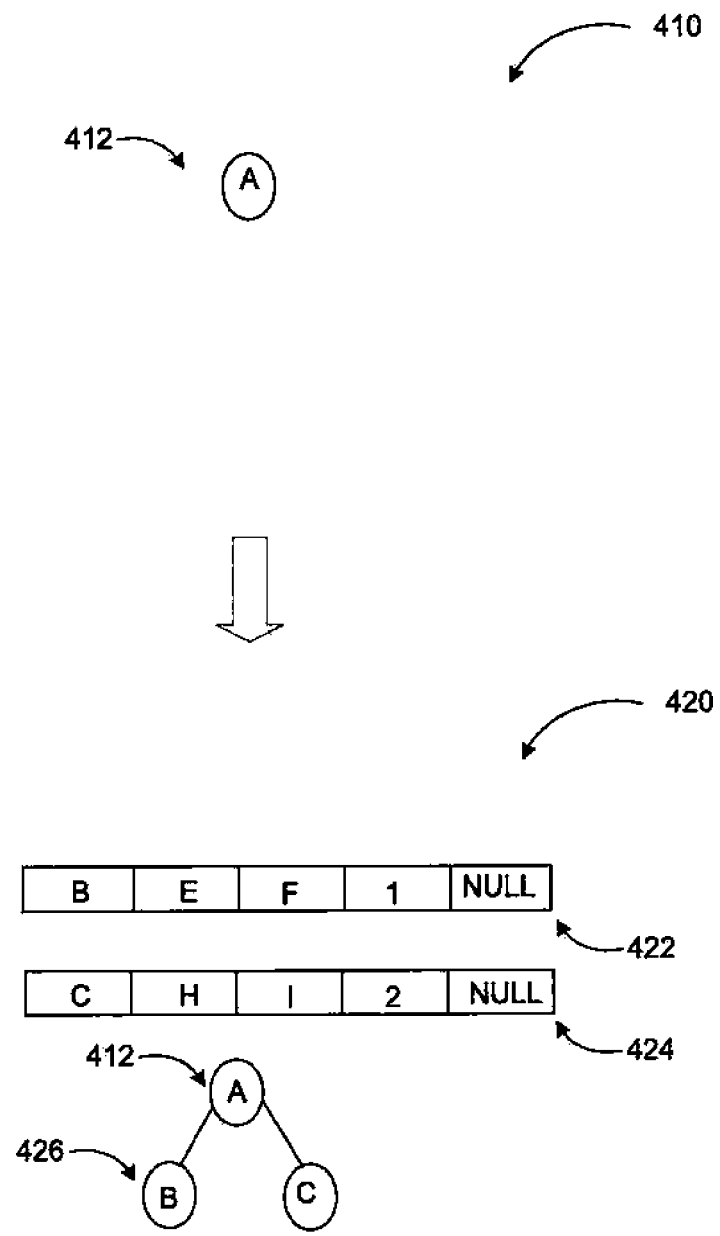
FIG. 4A through 4C illustrate different operations in an example back conversion process from a binary tree to a k-ary tree.
Figure 4B:
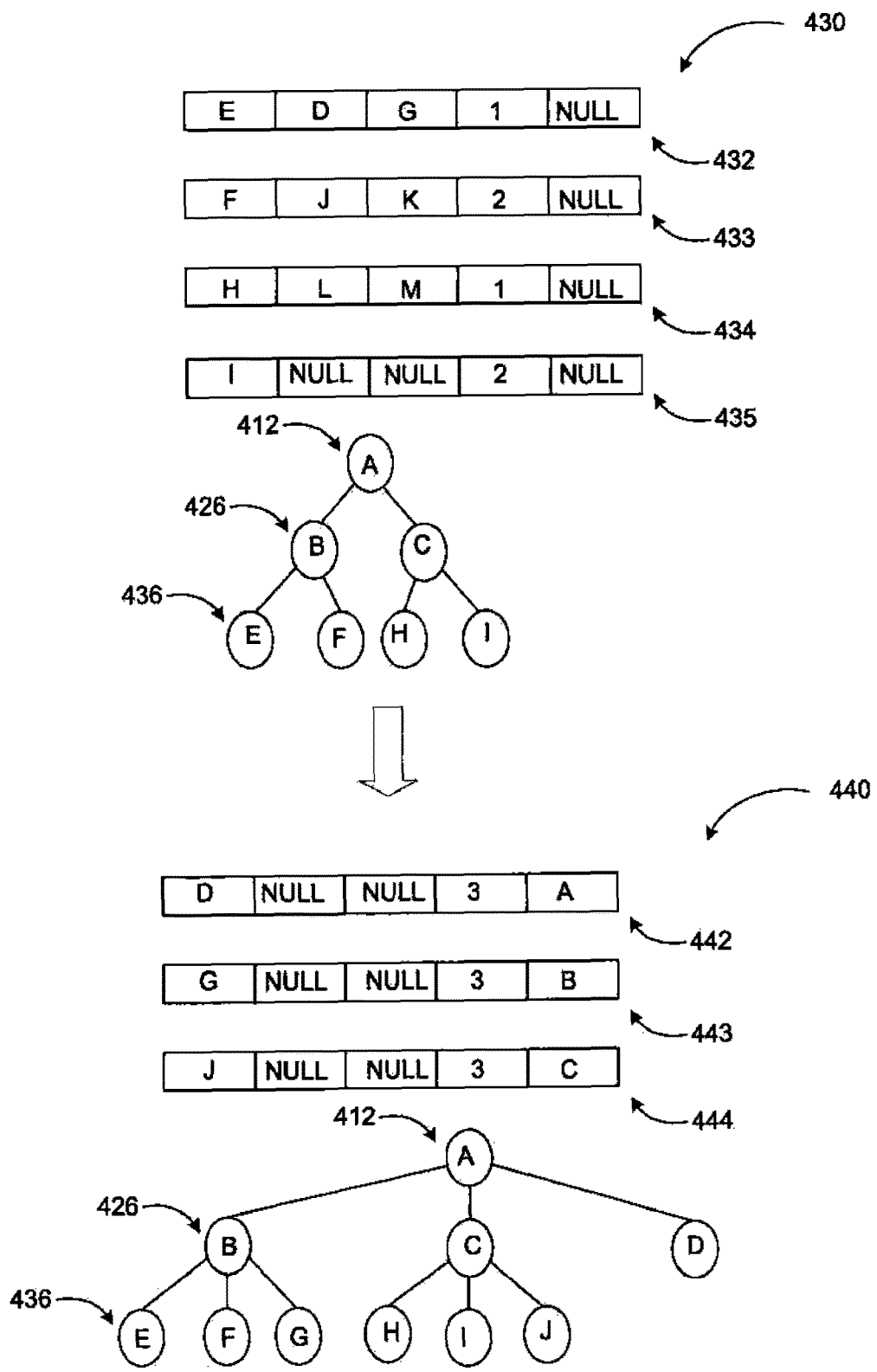
Figure 4C:
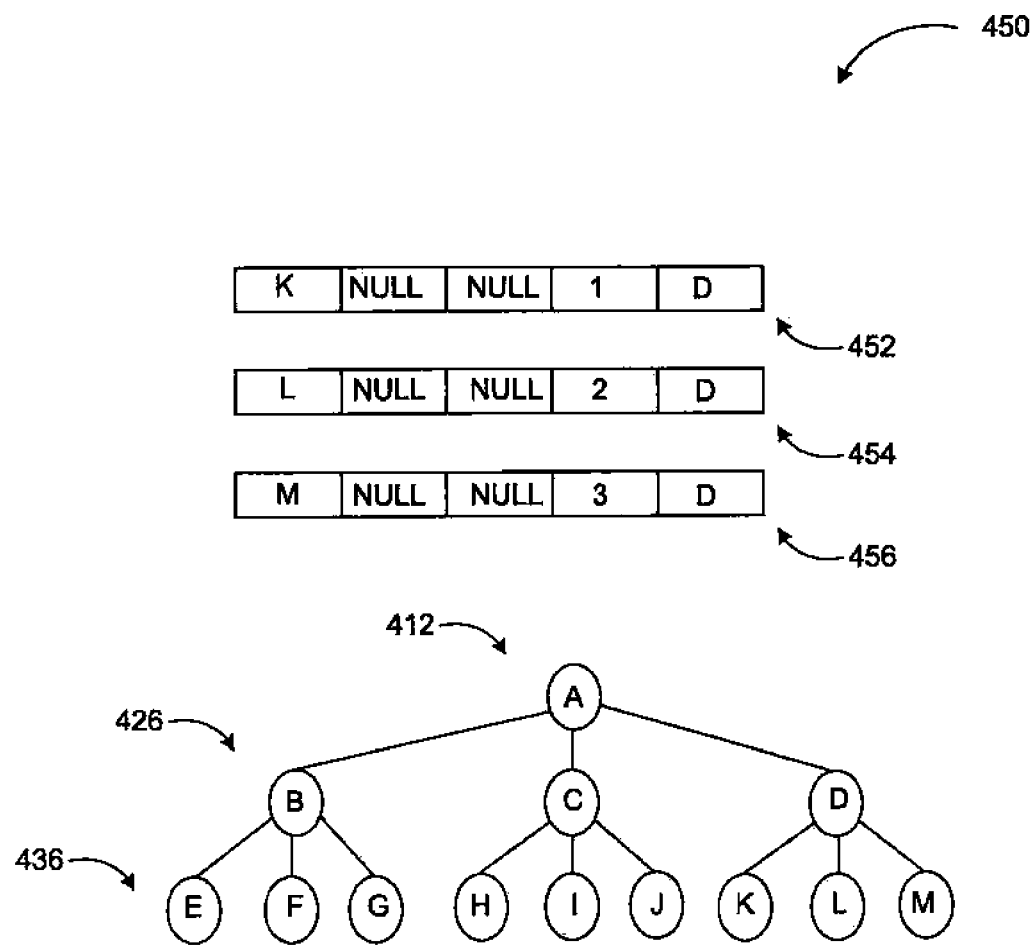

FIGS. 4A through 4C illustrate different operations in an example back conversion process from a binary tree to a k-ary tree in accordance with at least some embodiments described herein. In some embodiments, a process similar to the above described technique may be used to convert an equivalent binary tree structure back to the original k-ary tree.

FIG. 4A depicts a first operation 410 and a second operation 420 in converting an equivalent binary tree (e.g., the equivalent binary tree described above in relation to FIGS. 2A-C) back to an original k-ary tree structure (e.g., the k-ary tree structure 210 depicted in FIG. 2A). In the first operation 410, the root node of the binary tree (e.g., node A) may be selected as the root node 412 of the k-ary tree structure. As a particular node is inserted from the equivalent binary tree to the k-ary tree structure, the children of the particular node in the binary tree may be tracked. If a child of the particular node in the binary tree was also its child in the original k-ary tree, then that child is re-inserted as the particular node's child in the k-ary tree. Finding out whether the parent of a node in the binary tree was its original parent in the k-ary tree may be accomplished based on the node data structure (e.g., the data structure 320 described above in relation to FIG. 3). Specifically, a parent data field (e.g., the parent data field 329) of the node data structure may be used to determine the identity of the particular node's parent node in the original k-ary tree, and a child number field (e.g., child number field 328) of the node data structure may be used to determine which child of the parent this particular node is.

For example, in operation 420, the children of a root node A in the binary tree are nodes B and C. A node data structure 422 of the node B may indicate that it has nodes E and F as children in the binary tree, that it was the first (i.e., leftmost) child in the original k-ary tree, and that its parent in the original k-ary tree was the node A (the same as its parent in the binary tree, indicated by the NULL value). Therefore, node B may be inserted at the second level 426 of the k-ary tree as the leftmost child of the root node A. Similarly, a node data structure 424 of the node C may indicate that it has nodes H and I as children in the binary tree, that it was the second child in the original k-ary tree, and that its parent in the original k-ary tree was the node A (the same as its parent in the binary tree, indicated by the NULL value). Therefore, node C may be inserted at the second level 426 of the k-ary tree as the second child of the root node A.

This conversion process may continue in operations 430 and 440 in FIG. 4B. In the operation 430, the node data structures of each of the child nodes of the nodes B and C (the nodes E, F, H, and I) may be evaluated. A node data structure 432 of the node E may indicate that it has the nodes D and G as children in the binary tree, that it was the first (i.e., leftmost) child of its parent in the original k-ary tree, and that its parent in the original k-ary tree was the node B (the same as its parent in the binary tree, indicated by the NULL value). Similarly, a node data structure 433 of the node F may indicate that it has nodes J and K as children in the binary tree, that it was the second child of its parent in the original k-ary tree, and that its parent in the original k-ary tree was the node B (the same as its parent in the binary tree, indicated by the NULL value). The nodes E and F may then be inserted into the third level 436 of the k-ary tree as the two leftmost children of the node B.

Similarly, a node data structure 434 of the node H may indicate that it has nodes L and M as children in the binary tree, that it was the first (i.e., leftmost) child of its parent in the original k-ary tree, and that its parent in the original k-ary tree was the node C (the same as its parent in the binary tree, indicated by the NULL value). Finally, a node data structure 435 of the node I may indicate that it has no children in the binary tree (indicated by the first two NULL values), that it was the second child of its parent in the original k-ary tree, and that its parent in the original k-ary tree was the node C (the same as its parent in the binary tree, indicated by the NULL value). The nodes H and I may then be inserted into the third level 436 of the k-ary tree as the two leftmost children of the node C.

In a subsequent operation 440, the node data structures of some of the child nodes of the nodes E, F, and H in the binary tree (node I has no children, as indicated above) may be evaluated. A node data structure 442 of the node D may indicate that it has no children in the binary tree (indicated by the two NULL values), that it was the third (i.e., rightmost for a k value of 3) child of its parent in the original k-ary tree, and that its parent in the original k-ary tree was the node A. The node D may therefore be inserted into the second level 426 of the k-ary tree as the rightmost child of the node A. Similarly, a node data structure 443 of the node G may indicate that it has no children in the binary tree (indicated by the two NULL values), that it was the third (i.e., rightmost for a k value of 3) child of its parent in the original k-ary tree, and that its parent in the original k-ary tree was the node B. The node G may then be inserted into the third level 436 of the k-ary tree as the rightmost child of the node B. A node data structure 444 of the node J may indicate that it has no children in the binary tree (indicated by the two NULL values), that it was the third (i.e., rightmost for a k value of 3) child of its parent in the original k-ary tree, and that its parent in the original k-ary tree was the node C. The node J may then be inserted into the third level 436 of the k-ary tree as the rightmost child of the node C.

Finally, the conversion process may end with a operation 450 in FIG. 4C, where the node data structures of the remaining child nodes (if any) of nodes E, F, and H in the binary tree (the nodes D, G, and J have no children in the binary tree, as indicated above) may be evaluated. A node data structure 452 of the node K may indicate that it has no children in the binary tree (indicated by the two NULL values), that it was the first (i.e., leftmost) child of its parent in the original k-ary tree, and that its parent in the original k-ary tree was the node D. Similarly, a node data structure 454 of the node L may indicate that it has no children in the binary tree (indicated by the two NULL values), that it was the second child of its parent in the original k-ary tree, and that its parent in the original k-ary tree was the node D. Finally, a node data structure 456 of the node M may indicate that it has no children in the binary tree (indicated by the two NULL values), that it was the third (i.e., rightmost for a k value of 3) child of its parent in the original k-ary tree, and that its parent in the original k-ary tree was the node D. The nodes K, L, and M may then be inserted into the third level 436 of the k-ary tree as first, second, and third children of the node D.

FIG. 5 illustrates a general purpose computing device, which may be used to convert a k-ary tree to its equivalent binary tree and/or perform a reverse/back conversion from a binary tree to its equivalent k-ary tree using a complete height balanced technique, arranged in accordance with at least some embodiments described herein. For example, the computing device 500 may be used to implement the CHBT conversion application 106 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one or more levels of caching, such as a cache memory 512, a processor core 514, and registers 516. The example processor core 514 may include an arithmetic logic unit (ALU), a floating point unit (FPU), a digital signal processing core (DSP core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more conversion applications 522, and program data 524. The conversion applications 522 may perform conversion of k-ary tree structures to equivalent binary tree structures and vice versa as described herein. The program data 524 may include, among other data, k-ary tree/binary tree data 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 may include a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
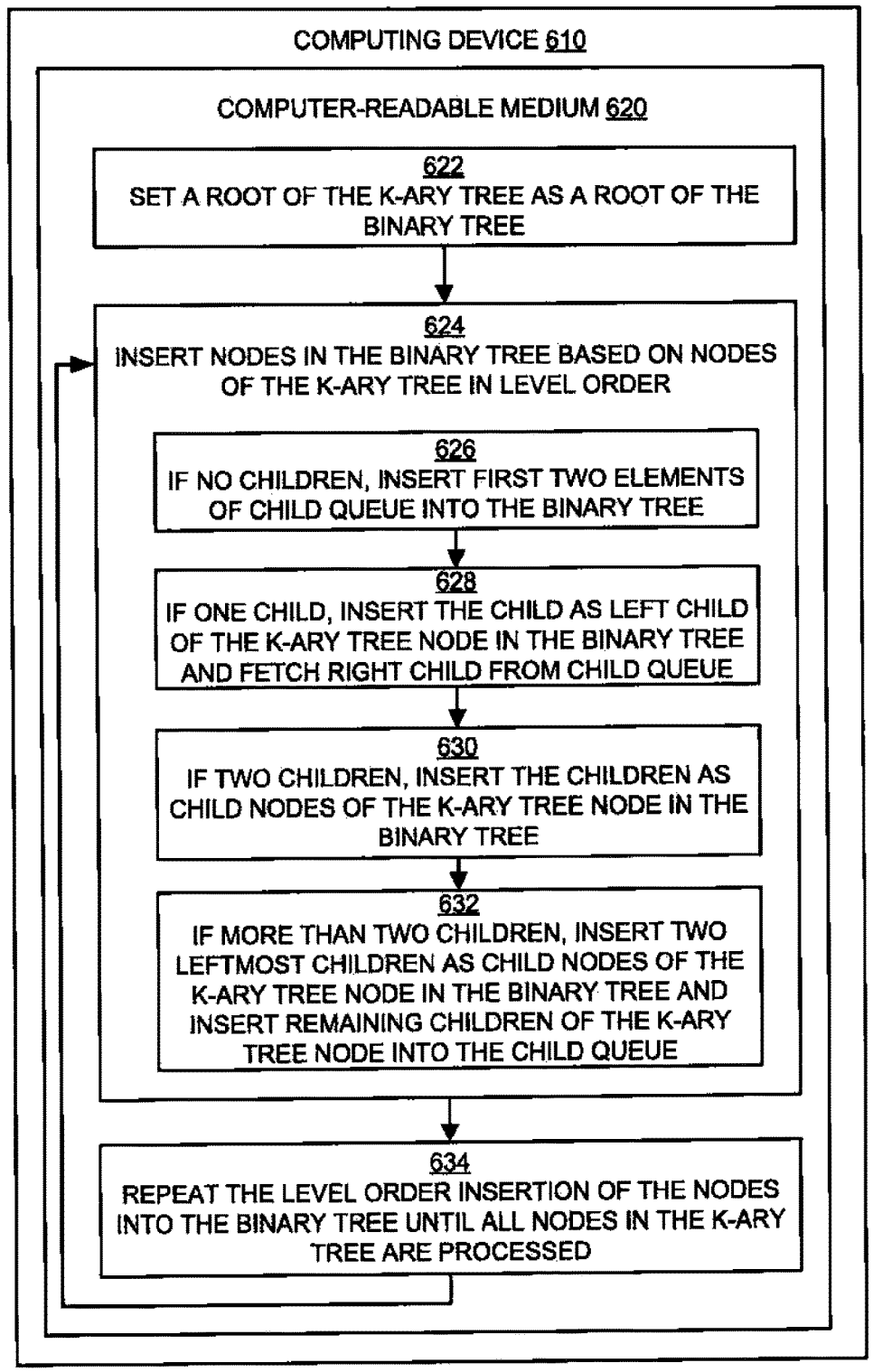
FIG. 6 is a flow diagram illustrating an example method that may be performed by a computing device such as the device in FIG. 5.

FIG. 6 is a flow diagram illustrating an example method that may be performed by a computing device such as computing device 500 in FIG. 5, arranged in accordance with at least some embodiments described herein. Example methods may include one or more operations, functions or actions as illustrated by one or more of blocks 622, 624, 626,

628, 630, 632, and/or 634. The operations described in the blocks 622 through 634 may also be stored as computer-executable instructions in a computer-readable medium such as a computer-readable medium 620 of a computing device 610.

An example process for converting a k-ary tree structure to an equivalent binary tree structure may begin with block 622, "SET A ROOT OF THE K-ARY TREE AS A ROOT OF THE BINARY TREE", where the root node of the k-ary tree may be set as the root node of the equivalent binary tree, as described above in relation to FIG. 2A.

Block 622 may be followed by block 624, "INSERT NODES INTO THE BINARY TREE BASED ON NODES OF THE K-ARY TREE IN LEVEL ORDER", in which nodes in the k-ary tree structure may be analyzed to determine where they belong to the equivalent binary tree. Block 624 may include block 626, "IF NO CHILDREN, INSERT FIRST TWO ELEMENTS OF CHILD QUEUE INTO THE BINARY TREE", where if a particular node in the binary tree has no children in the k-ary tree, the front/first two elements of the child queue (e.g., the child queues described above in FIGS. 2A-C) may be inserted into the binary tree as children of the particular node.

Block 624 may also include block 628, "IF ONE CHILD, INSERT THE CHILD AS LEFT CHILD OF THE K-ARY TREE NODE IN THE BINARY TREE AND FETCH RIGHT CHILD FROM CHILD QUEUE", where if a particular node in the binary tree has one child in the k-ary tree (as any one of the 1 through k possible children), the one child may be inserted as the left child of the particular node in the binary tree, and the other child may be fetched from the child queue and inserted as the left child of the particular node in the binary tree.

Block 628 may be followed by block 630, "IF TWO CHILDREN, INSERT THE CHILDREN AS CHILD NODES OF THE K-ARY TREE NODE IN THE BINARY TREE", where if a particular node in the binary tree has two children in the k-ary tree, both children may be inserted as the children of the particular node in the binary tree.

Block 630 may be followed by block 632, "IF MORE THAN TWO CHILDREN, INSERT TWO LEFTMOST CHILDREN AS CHILD NODES OF THE K-ARY TREE NODE IN THE BINARY TREE AND INSERT REMAINING CHILDREN OF THE K-ARY TREE NODE INTO THE CHILD QUEUE", where if a particular node in the binary tree has more than two children in the k-ary tree, the two leftmost children in the k-ary tree may be inserted as children of the particular node in the binary tree, and any remaining children of that particular node may be inserted into the child queue in a FIFO fashion as described above in relation to FIGS. 2A-C.

Block 632 (and block 624) may be followed by block 634, "REPEAT THE LEVEL ORDER INSERTION OF THE NODES INTO THE BINARY TREE UNTIL ALL NODES IN THE K-ARY TREE ARE PROCESSED", where the block 624 (and the blocks within it) is repeated to process and insert each node from the k-ary tree into the equivalent binary tree structure until all nodes in the k-ary tree have been processed.

The blocks included in the above described process are for illustration purposes. Converting k-ary tree structures to equivalent binary tree structures may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Furthermore, a reverse/back conversion process may be employed by the CHBT conversion application 106 to create the k-ary tree structure 104 from the binary tree 108 following a reverse technique as described above in conjunction with FIG. 4A through 4C using similar blocks to those in FIG. 6.

Figure 7:
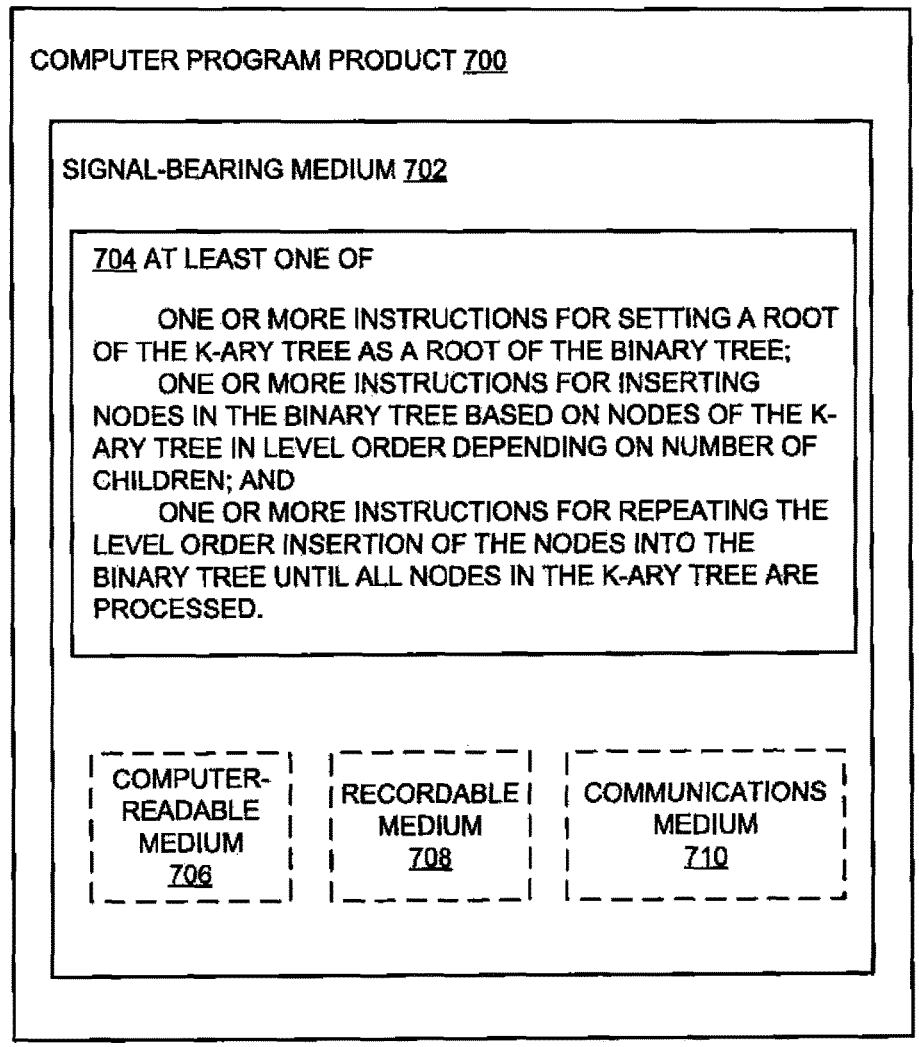
FIG. 7 illustrates a block diagram of an example computer program product, all arranged in accordance with at least some embodiments described herein.

FIG. 7 illustrates a block diagram of an example computer program product arranged in accordance with at least some embodiments described herein.

In some examples, as shown in FIG. 7, the computer program product 700 may include a signal-bearing medium 702 that may also include one or more machine readable instructions 704 that, when executed by, for example, a processor may provide the functionality described herein. Thus, for example, referring to the processor 504 in FIG. 5, the conversion application 522 may undertake one or more of the tasks shown in FIG. 7 in response to the instructions 704 conveyed to the processor 504 by the signal-bearing medium 702 to perform actions associated with converting k-ary tree structures to equivalent binary tree structures as described herein. Some of those instructions may include, for example, setting a root of the binary tree and/or inserting nodes into the binary tree based on nodes of the k-ary tree in level order, according to some embodiments described herein. In other embodiments, a reverse/back conversion process may be employed by the conversion application 522 to create a k-ary tree structure from a binary tree following a reverse technique as described above in conjunction with FIG. 4A through 4C using similar instructions to those in FIG. 7.

In some implementations, the signal-bearing medium 702 depicted in FIG. 7 may encompass a computer-readable medium 706, such as, but not limited to, a hard disk drive (HDD), a solid state drive (SSD), a Compact Disc (CD), a Digital Versatile Disk (DVD), a digital tape, memory, etc. In some implementations, the signal-bearing medium 702 may encompass a recordable medium 708, such as, but not limited to, memory, read/write (R/W) CDs, R/W DVDs, etc. In some implementations, the signal-bearing medium 702 may encompass a communications medium 710, such as, but not limited to, a digital and/or an analog communication medium (e.g., a fiber optic cable, a waveguide, a wired communications link, a wireless communications link, etc.). Thus, for example, the computer program product 700 may be conveyed to one or more modules of the processor 704 by an RE signal-bearing medium, where the signal-bearing medium 702 is conveyed by the wireless communications medium 710 (e.g., a wireless communications medium conforming with the IEEE 802.11 standard).

According to some examples, a method for converting a k-ary tree to an equivalent height balanced binary tree may include setting root of the k-ary tree as a root of the binary tree, inserting nodes in the binary tree based on nodes of the k-ary tree in level order by: if the k-ary tree node has no children, inserting first two elements of a child queue into the binary tree; if the k-ary tree node has one child, inserting the child as a left child of the k-ary tree node in the binary tree and inserting a first element of the child queue into the binary tree as a right child of the k-ary tree node; if the k-ary tree node has two children, inserting the two children as child nodes of the k-ary tree node in the binary tree; and if the k-ary tree node has more than two children, inserting two leftmost children of the k-ary tree node as child nodes of the k-ary tree node in the binary tree and inserting remaining children of the k-ary tree node into the child queue, and repeating the level order insertion of the nodes into the binary tree until all nodes in the k-ary tree are processed.

According to other embodiments, the method may further include maintaining a hands remaining queue listing nodes with free links and a number of free links associated with each node on the list in the level order from left to right and/or updating the hands remaining queue each time a node is inserted into the binary tree. The method may further include, if the k-ary tree node is being inserted from the child queue then introducing all children of the k-ary tree node in the k-ary tree into the child queue and repeating the level order insertion of the nodes until the child queue is empty. The child queue may be employed to store remaining children that have not yet been inserted into the binary tree. The method may further include employing a First-In-First-Out (FIFO) order in storing and retrieving children in the child queue.

According to further embodiments, the method may further include employing a (k+1) field data structure for storing a node structure of the k-ary tree, wherein a first field is used to store a key of a node in the k-ary tree and subsequent k fields are used to store pointers to respective children of the node in the k-ary tree. The method may further include employing a five-field data structure for storing a node structure of the binary tree, wherein a first field is used to store a key of a node in the binary tree, a second field is used to store a pointer to a left child of the node in the binary tree, a third field is used to store a pointer to a right child of the node in the binary tree, a fourth field is used to indicate an order of the node in the binary tree among children of a parent node, and a fifth field is used to store a pointer to the parent node. The fourth and the fifth fields may have Null value if the node is the root of the binary tree. The method may further include obtaining the k-ary tree back from the equivalent binary tree by setting a root of the binary tree as a root of the k-ary tree, for each node in the binary tree to be inserted into the k-ary tree, determining whether child nodes associated with each node are original child nodes based on the fifth field of the five-field data structure, for each original child node repeating determination of original children and inserting the original children in the k-ary tree under their respective parent nodes based on the fourth field of the five-field data structure, and repeating insertion of nodes into the k-ary tree until all nodes in the binary tree are processed, determining whether child nodes associated with each node are original child nodes based on the fourth and fifth fields of the five-field data structure, for each original child node repeating the determination of original children and inserting the original children in the k-ary tree under their respective parent nodes in a level order, and repeating the level order insertion of the nodes into the k-ary tree until all nodes in the binary tree are processed.

According to other examples, a computing device for converting a k-ary tree to an equivalent height-balanced binary tree may include a memory configured to store instructions and a processing unit configured to execute a conversion application in conjunction with the instructions. The conversion application may set a root of the k-ary tree as a root of the binary tree, insert nodes in the binary tree based on nodes of the k-ary tree in level order by: if a k-ary tree node has no children, insert first two elements of a child queue into the binary tree; if the k-ary tree node has one child, insert the child as a left child of the k-ary tree node in the binary tree and insert a first element of the child queue into the binary tree as a right child of the k-ary tree node; if the k-ary tree node has two children, insert the two children as child nodes of the k-ary tree node in the binary tree; and if the k-ary tree node has more than two children, insert two leftmost children of the k-ary tree node as child nodes of the k-ary tree node in the binary tree and insert remaining children of the k-ary tree node into the child queue, and repeat the level order insertion of the nodes into the binary tree until all nodes in the k-ary tree are processed.

According to other embodiments, the conversion application may be further configured to maintain a hands remaining queue listing nodes with free links and a number of free links associated with each node on the list in the level order from left to right and/or update the hands remaining queue each time a node is inserted into the binary tree. The conversion application may be further configured to, if the k-ary tree node is being inserted from the child queue then introduce all children of the k-ary tree node in the k-ary tree into the child queue and repeat the level order insertion of the nodes until the child queue is empty. The child queue may be employed to store remaining children that have not yet been inserted into the binary tree. The conversion application may be further configured to employ a First-In-First-Out (FIFO) order in storing and retrieving children in the child queue.

According to further embodiments, the conversion application may be further configured to employ a (k+1)-field data structure for storing a node structure of the k-ary tree, wherein a first field is used to store a key of a node in the k-ary tree and subsequent k fields are used to store pointers to respective children of the node in the k-ary tree. The conversion application may be further configured to employ a five-field data structure for storing a node structure of the binary tree, wherein a first field is used to store a key of a node in the binary tree, a second field is used to store a pointer to a left child of the node in the binary tree, a third field is used to store a pointer to a right child of the node in the binary tree, a fourth field is used to indicate an order of the node in the k-ary tree among children of its parent node, and a fifth field is used to store a pointer to the parent node. The fourth and the fifth fields may have NULL value if the node is the root of a binary tree. The conversion application may be further configured to obtain the k-ary tree back from the equivalent binary tree by setting a root of the binary tree as a root of the k-ary tree, for each node in the binary tree to be inserted into the k-ary tree, determining whether child nodes associated with each node are original child nodes based on the fifth field of the five-field data structure, for each original child node repeating determination of original children and inserting the original children in the k-ary tree under their respective parent nodes based on the fourth field of the five-field data structure, and repeating insertion of nodes into the k-ary tree until all nodes in the binary tree are processed. In some embodiments, the conversion application may be employed to index a database.

According to further examples, a computer-readable storage medium may have instructions stored thereon for converting a k-ary tree to an equivalent height balanced binary tree. The instructions may include setting a root of the k-ary tree as a root of the binary tree, inserting nodes in the binary tree based on nodes of the k-ary tree in level order by: if the k-ary tree node has no children, inserting first two elements of a child queue into the binary tree; if the k-ary tree node has one child, inserting the child as a left child of the k-ary tree node in the binary tree and inserting a first element of the child queue into the binary tree as a right child of the k-ary tree node; if the k-ary tree node has two children, inserting the two children as child nodes of the k-ary tree node in the binary tree; and if the k-ary tree node has more than two children, inserting two leftmost children of the k-ary tree node as child nodes of the k-ary tree node in the binary tree and inserting remaining children of the k-ary tree node into the child queue, and repeating the level order insertion of the nodes into the binary tree until all nodes in the k-ary tree are processed.

According to other embodiments, the instructions may further include maintaining a hands remaining queue listing nodes with free links and a number of free links associated with each node on the list in the level order from left to right and/or updating the hands remaining queue each time a node is inserted into the binary tree. The instructions may further include, if the k-ary tree node is being inserted from the child queue then introducing all children of the k-ary tree node in the k-ary tree into the child queue and repeating the level order insertion of the nodes until the child queue is empty. The child queue may be employed to store remaining children that have not yet been inserted into the binary tree. The instructions may further include employing a First-In-First-Out (FIFO) order in storing and retrieving children in the child queue.

According to further embodiments, the instructions may further include employing a (k+1)-field data structure for storing a node structure of the k-ary tree, wherein a first field is used to store a key of a node in the k-ary tree and subsequent k fields are used to store pointers to respective children of the node in the k-ary tree. The instructions may further include employing a five-field data structure for storing a node structure of the binary tree, wherein a first field is used to store a key of a node in the binary tree, a second field is used to store a pointer to a left child of the node in the binary tree, a third field is used to store a pointer to a right child of the node in the binary tree, a fourth field is used to indicate an order of the node in the binary tree among children of a parent node, and a fifth field is used to store a pointer to the parent node. The fourth and the fifth fields may have NULL value if the node is the root of a binary tree. The method may further include obtaining the k-ary tree back from the equivalent binary tree by setting a root of the binary tree as a root of the k-ary tree, for each node in the binary tree to be inserted into the k-ary tree, determining whether child nodes associated with each node are original child nodes based on the fifth field of the five-field data structure, for each original child node repeating determination of original children and inserting the original children in the k-ary tree under their respective parent nodes based on the fourth field of the five-field data structure, and repeating insertion of nodes into the k-ary tree until all nodes in the binary tree are processed.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. In so far as such block diagrams, flowcharts, and/or examples contain one or more functions and/or operations, it will be understood by those within the art that each function and/or operation within such block diagrams, flowcharts, and/or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium (e.g., a fiber optic cable a waveguide, a wired communications link, a wireless communications link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include, but are not limited to, physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer implemented method performed by a processor, the processor configured to process a set of instructions stored in a memory to convert a k-ary (k≥3) tree to an equivalent height balanced binary tree, the k-ary tree comprising at least three levels, the method comprising:
    storing, in one or more data structures, one or more nodes of the k-ary tree, wherein the one or more nodes of the k-ary tree comprise a root of the k-ary tree;
    setting the root of the k-ary tree as a root of the height balanced binary tree;
    initiating a hands remaining queue that lists the root of the height balanced binary tree with free links and a number of free links associated with the root of the height balanced binary tree in level order from left to right;

inserting nodes in the height balanced binary tree based on the one or more nodes of the k-ary tree in the level order by:

determining, for each node of the k-ary tree, a number of children for the node of the k-ary tree, wherein:

in response to a determination that the node of the k-ary tree has no children, first two elements of a child queue are inserted into the height balanced binary tree, wherein the child queue temporarily stores at least one node of the k-ary tree, and wherein the stored at least one node of the k-ary tree comprises a child node of another node of the k-ary tree that was previously inserted into the height balanced binary tree;

in response to a determination that the node of the k-ary tree has one child, the child is inserted as a left child of the node of the k-ary tree in the height balanced binary tree and a first element of the child queue is inserted into the height balanced binary tree as a right child of the node of the k-ary tree;

in response to a determination that the node of the k-ary tree has two children, the two children are inserted as child nodes of the node of the k-ary tree in the height balanced binary tree; and in response to a determination that the node of the k-ary tree has more than two children, two leftmost children of the node of the k-ary tree are inserted as child nodes of the node of the k-ary tree in the height balanced binary tree and remaining children of the node of the k-ary tree are inserted into the child queue;

wherein insertion of each node of the k-ary tree into the height balanced binary tree is performed by associating the each node of the k-ary tree with a node of the height balanced binary tree that has free links listed in the hands remaining queue, and wherein the hands remaining queue is updated after the level order insertion of the each node of the k-ary tree;

repeating the level order insertion of the nodes of the k-ary tree into the height balanced binary tree until all nodes in the k-ary tree are processed; and indexing a database by use of the nodes inserted into the height balanced binary tree, wherein the indexed database facilitates storage of the nodes of the height balanced binary tree in a first space, the first space lesser than a second space to store the one or more nodes of the k-ary tree.

2. The method according to claim 1, further comprising:
maintaining, during the level order insertion, the hands remaining queue which lists one or more nodes of the height balanced binary tree with free links and a number of free links associated with each node in the level order from left to right, wherein the one or more nodes with the free links at a particular time are nodes at least depth of the height balanced binary tree at the particular time during the level order insertion, and wherein the free links of each of the nodes at the least depth indicate that the node has available links to accommodate one or more children at the particular time.

3. The method according to claim 1, further comprising:
in response to a determination that the node of the k-ary tree is being inserted from the child queue, then introducing all children of the node of the k-ary tree into the child queue; and repeating the level order insertion of the nodes of the k-ary tree until the child queue is empty.

4. The method according to claim 3, wherein:
storing and retrieving children in the child queue includes employing a first-in-first-out (FIFO) order.

5. A computing device to convert a k-ary (k≥3) tree to an equivalent height balanced binary tree, the k-ary tree comprising at least three levels, the computing device comprising:

a memory configured to store instructions, wherein the memory is further configured to:
store, in one or more data structures, one or more nodes of the k-ary tree, wherein the one or more nodes of the k-ary tree comprise a root of the k-ary tree; and a processing unit coupled to the memory and configured to execute a conversion application in conjunction with the stored instructions, wherein the conversion application is configured to:

set the root of the k-ary tree as a root of the height balanced binary tree;

initiate a hands remaining queue that lists the root of the height balanced binary tree with free links and a number of free links associated with the root of the height balanced binary tree in level order from left to right;

insert nodes in the height balanced binary tree based on the one or more nodes of the k-ary tree in the level order by:

determination, for each node of the k-ary tree, of a number of children for the node of the k-ary tree, wherein:

in response to a determination that the node of the k-ary tree has no children, first two elements of a child queue are inserted into the height balanced binary tree, wherein the child queue temporarily stores at least one node of the k-ary tree, and wherein the stored at least one node of the k-ary tree comprises a child, node of another node of the k-ary tree that was previously inserted into the height balanced binary tree;

in response to a determination that the node of the k-ary tree has one child, the child is inserted as a left child of the node of the k-ary tree in the height balanced binary tree and a first element of the child queue is inserted into the height balanced binary tree as a right child of the node of the k-ary tree;

in response to a determination that the node of the k-ary tree has two children, the two children are inserted as child nodes of the node of the k-ary tree in the height balanced binary tree; and in response to a determination that the node of the k-ary tree has more than two children, two leftmost children of the node of the k-ary tree are inserted as child nodes of the node of the k-ary tree in the height balanced binary tree and remaining children of the node of the k-ary tree are inserted into the child queue;

wherein insertion of each node of the k-ary tree into the height balanced binary tree is performed by association of the each node of the k-ary tree node with a node of the height balanced binary tree that has free links listed in the hands remaining queue, and wherein the hands remaining queue is updated after the level order insertion of the each node of the tree;

repeat the level order insertion of the nodes of the k-ary tree into the height balanced binary tree until all nodes in the k-ary tree are processed; and index a database b use of the nodes inserted into the height balanced binary tree, wherein the indexed database facilitates storage of the nodes of the height balanced binary tree in a first space, the first space lesser than a second space to store the one or more nodes of the k-ary tree.

6. The computing device according to claim 5, wherein the conversion application is configured to:

employ a (k+1)-field data structure to store a node structure of the k-ary tree, wherein a first field is used to store a key of a node in the k-ary tree and subsequent k fields are used to store pointers to respective children of the node in the k-ary tree.

7. The computing device according to claim 6, wherein the conversion application is configured to:

employ a five-field data structure to store a node structure of the height balanced binary tree, wherein a first field of the five-field data structure is used to store a key of a node in the height balanced binary tree, a second field of the five-field data structure is used to store a pointer to a left child of the node in the height balanced binary tree, a third field of the five-field data structure is used to store a pointer to a right child of the node in the height balanced binary tree, a fourth field of the five-field data structure is used to indicate an order of the node in the height balanced binary tree among children of a parent node, and a fifth field of the five-field data structure is used to store a pointer to the parent node.

8. The computing device according to claim 7, wherein the fourth field and the fifth field have a null value if the node in the height balanced binary tree does not have the parent node.

9. The computing device according to claim 8, wherein the conversion application is further configured to:

obtain the k-ary tree back from the equivalent height balanced binary tree by:

set the root of the height balanced binary tree as the root of the k-ary tree;

for each node in the height balanced binary tree to be inserted into the k-ary tree, determine whether child nodes associated with the each node in the height balanced binary tree are original child nodes based on the fourth field and fifth field of the five-field data structure;

for each original child node, repeat determination of original children and insert the original children in the k-ary tree under their respective parent nodes based on the fourth field of the five-field data structure; and repeat insertion of nodes into the k-ary tree until all nodes in the height balanced binary tree are processed.

10. A non-transitory computer-readable storage medium having instructions stored thereon, which in response to execution by a processor, convert a k-ary (k≥3) tree to an equivalent height balanced binary tree, the k-ary tree comprising at least three levels, the instructions being executable to perform operations comprising:

store, in one or more data structures, one or more nodes of the k-ary tree, wherein the one or more nodes of the k-ary tree comprise a root of the k-ary tree;

set the root of the k-ary tree as a root of the height balanced binary tree;

initiate a hands remaining queue that lists the root of the height balanced binary tree with free links and a number of free links associated with the root of the height balanced binary tree in level order from left to right;

insert nodes in the height balanced binary tree based on the one or more nodes of the k-ary tree in the level order by:

determination, for each node of the k-ary tree, of a number of children for the node of the k-ary tree, wherein:

in response to a determination that a node of the k-ary tree has no children, first two elements of a child queue are inserted into the height balanced binary tree, wherein the child queue temporarily stores at least one node of the k-ary tree, and wherein the stored at least one node of the k-ary tree comprises a child node of another node of the k-ary tree that was previously inserted into the height balanced binary tree;

in response to a determination that the node of the k-ary tree has one child, the child is inserted as a left child of the node of the k-ary tree in the height balanced binary tree and a first element of the child queue is inserted into the height balanced binary tree as a right child of the node of the k-ary tree;

in response to a determination that the node of the k-ary tree has two children, the two children are inserted as child nodes of the node of the k-ary tree in the height balanced binary tree; and in response to a determination that the node of the k-ary tree has more than two children, two leftmost children of the node of the k-ary tree are inserted as child nodes of the node of the k-ary tree in the height balanced binary tree and remaining children of the node of the k-ary tree are inserted into the child queue;

wherein insertion of each node of the k-ary tree into the height balanced binary tree is performed by association of the each node of the k-ary tree with a node of the height balanced binary tree that has free links listed in the hands remaining queue, and wherein the hands remaining queue is updated after the level order insertion of the each node of the k-ary tree;

repeat the level order insertion of the nodes of the k-ary tree into the height balanced binary tree until all nodes in the k-ary tree are processed; and index a database by use of the nodes inserted into the height balanced binary tree, wherein the indexed database facilitates storage of the nodes of the height balanced binary tree in a first space, the first space lesser than a second space to store the one or more nodes of the k-ary tree.

11. The non-transitory computer-readable storage medium according to claim 10, wherein the instructions are executable to perform operations that further comprise:

maintain, during the level order insertion, the hands remaining queue which lists one or more nodes of the height balanced binary tree with free links and a number of free links associated with each node in the level order from left to right, wherein the one or more nodes with the free links at a particular time are nodes at least depth of the height balanced binary tree at the particular time during the level order insertion, and wherein the free links of each of the nodes at the least depth indicate that the node has available links to accommodate one or more children at particular time.

12. The non-transitory computer-readable storage medium according to claim 10, wherein the instructions are executable to perform operations that further comprise:

in response to a determination that the node of the k-ary tree is being inserted from the child queue, then introduce all children of the node of the k-ary tree into the child queue; and repeat the level order insertion of the nodes of the k-ary tree until the child queue is empty.

13. The non-transitory computer-readable storage medium according to claim 10, wherein the instructions are executable to perform operations that comprise:

employ a (k+1)-field data structure to store a node structure of the k-ary tree, wherein a first field is used to store a key of a node in the k-ary tree and subsequent k fields are used to store pointers to respective children of the node in the k-ary tree.

14. The non-transitory computer-readable storage medium according to claim 13, wherein the instructions are executable to perform operations that comprise:

employ a five-field data structure to store a node structure of the height balanced binary tree, wherein a first field of the five-field data structure is used to store a key of a node in the height balanced binary tree, a second field of the five-field data structure is used to store a pointer to a left child of the node in the height balanced binary tree, a third field of the five-field data structure is used to store a pointer to a right child of the node in the height balanced binary tree, a fourth field of the five-field data structure is used to indicate an order of the node in the height balanced binary tree among children of a parent node, and a fifth field of the five-field data structure is used to store a pointer to the parent node.

15. The non-transitory computer-readable storage medium according to claim 14, wherein the fourth field and the fifth field have a null value if the node in the height balanced binary tree does not have the parent node.

16. The non-transitory computer-readable storage medium according to claim 15, wherein the instructions are executable to perform operations that further comprise:

obtain the k-ary tree back from the equivalent height balanced binary tree by:

set the root of the height balanced binary tree as the root of the k-ary tree;

for the each node in the height balanced binary tree to be inserted into the k-ary tree, determine whether child nodes associated with the each node in the height balanced binary tree are original child nodes based on the fifth field of the five-field data structure;

for each original child node, repeat determination of original children and insert the original children in the k-ary tree under their respective parent nodes based on the fourth field of the five-field data structure; and repeat insertion of nodes into the k-ary tree until all nodes in the height balanced binary tree are processed.

* * * * *

UNITED STATES PATENT AND TRADEMARK OFFICE
CERTIFICATE OF CORRECTION

PATENT NO. : 9,715,514 B2  
APPLICATION NO. : 13/879804  
DATED : July 25, 2017  
INVENTOR(S) : Pal et al.

Page 1 of 1

It is certified that error appears in the above-identified patent and that said Letters Patent is hereby corrected as shown below:

In the Specification

In Column 1, Line 8, delete "wider" and insert -- under --, therefor.

In Column 7, Line 8, delete "node. A" and insert -- node A --, therefor.

In Column 7, Line 17, delete "node. A" and insert -- node A --, therefor.

In Column 7, Line 26, delete "nodeB" and insert -- node B --, therefor.

In Column 14, Line 46, delete "RE signal-bearing" and insert -- RF signal-bearing --, therefor.

In Column 18, Line 55, delete "fiber optic cable a" and insert -- fiber optic cable, a --, therefor.

In the Claims

In Column 22, Line 39, in Claim 5, delete "child, node" and insert -- child node --, therefor.

In Column 22, Line 67, in Claim 5, delete "the tree;" and insert -- the k-ary tree; --, therefor.

In Column 23, Line 4, in Claim 5, delete "b use" and insert -- by use --, therefor.

In Column 25, Line 2, in Claim 11, delete "at particular" and insert -- at the particular --, therefor.

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*